United States Patent [19]

Philippe et al.

[11] Patent Number: 5,785,015
[45] Date of Patent: Jul. 28, 1998

[54] INTERNAL COMBUSTION ENGINE PROVIDED WITH A SYSTEM FOR DIRECT FUEL INJECTION WITH PNEUMATIC ASSISTANCE

[76] Inventors: Luc Philippe, Bell Lloch 53-54, E-17246 Santa Cristina d'Aro; Benoit Philippe, Roca de Malvet 80, E-17246 Santa Cristina d'Aro, both of Spain

[21] Appl. No.: 716,422
[22] PCT Filed: Nov. 24, 1995
[86] PCT No.: PCT/ES95/00139
§ 371 Date: Sep. 20, 1996
§ 102(e) Date: Sep. 20, 1996
[87] PCT Pub. No.: WO96/17168
PCT Pub. Date: Jun. 6, 1996

[30] Foreign Application Priority Data

Dec. 2, 1994 [FR] France ................. 94 14618

[51] Int. Cl.$^6$ .............................................. F02B 33/06
[52] U.S. Cl. ................................ 123/70 R; 123/560
[58] Field of Search ...................... 123/68, 70 R, 123/72, 311, 560

[56] References Cited

U.S. PATENT DOCUMENTS

| 1,372,216 | 3/1921 | Casaday | 123/68 |
|---|---|---|---|
| 1,510,651 | 10/1924 | Burtnett | 123/311 |
| 1,512,673 | 10/1924 | Breguet | 123/68 |
| 1,634,468 | 7/1927 | Muller | 123/311 |
| 1,636,937 | 7/1927 | Hult | 123/560 |
| 1,666,384 | 4/1928 | Hult | 123/70 R |
| 1,690,080 | 10/1928 | Seng et al. | 123/560 |
| 2,349,967 | 5/1944 | Javal | 123/68 |
| 3,675,630 | 7/1972 | Stratton | 123/70 R |
| 3,805,747 | 4/1974 | Nakagawa et al. | 123/219 |
| 3,880,126 | 4/1975 | Thurston et al. | 123/70 R |
| 3,882,833 | 5/1975 | Longstaff et al. | 123/90.11 |
| 3,891,000 | 6/1975 | Melnick | 137/855 |
| 3,906,906 | 9/1975 | Arai | 123/209 |
| 4,344,405 | 8/1982 | Zaharis | 123/68 |
| 4,359,017 | 11/1982 | May | 123/63 R |
| 4,476,821 | 10/1984 | Robinson et al. | 123/68 |
| 4,506,634 | 3/1985 | Kerrebrock | 123/68 |
| 4,709,683 | 12/1987 | Schatz | 123/560 |
| 5,265,564 | 11/1993 | Dullaway | 123/70 R |

*Primary Examiner*—David A. Okonsky
*Attorney, Agent, or Firm*—James W. Miller

[57] ABSTRACT

The disclosed internal combustion engine comprises a single piston compressor (13) associated to each of the combustion chambers (1), said compressor sucking an air/fuel mixture and, due to the action of its discharge strokes, injects said mixture directly inside the combustion chamber (1) at an instant which is appropriately determinated by the synchronization of said compressor (13), the discharge valve (23) of the compressor being arranged inside the combustion chamber (1).

12 Claims, 10 Drawing Sheets

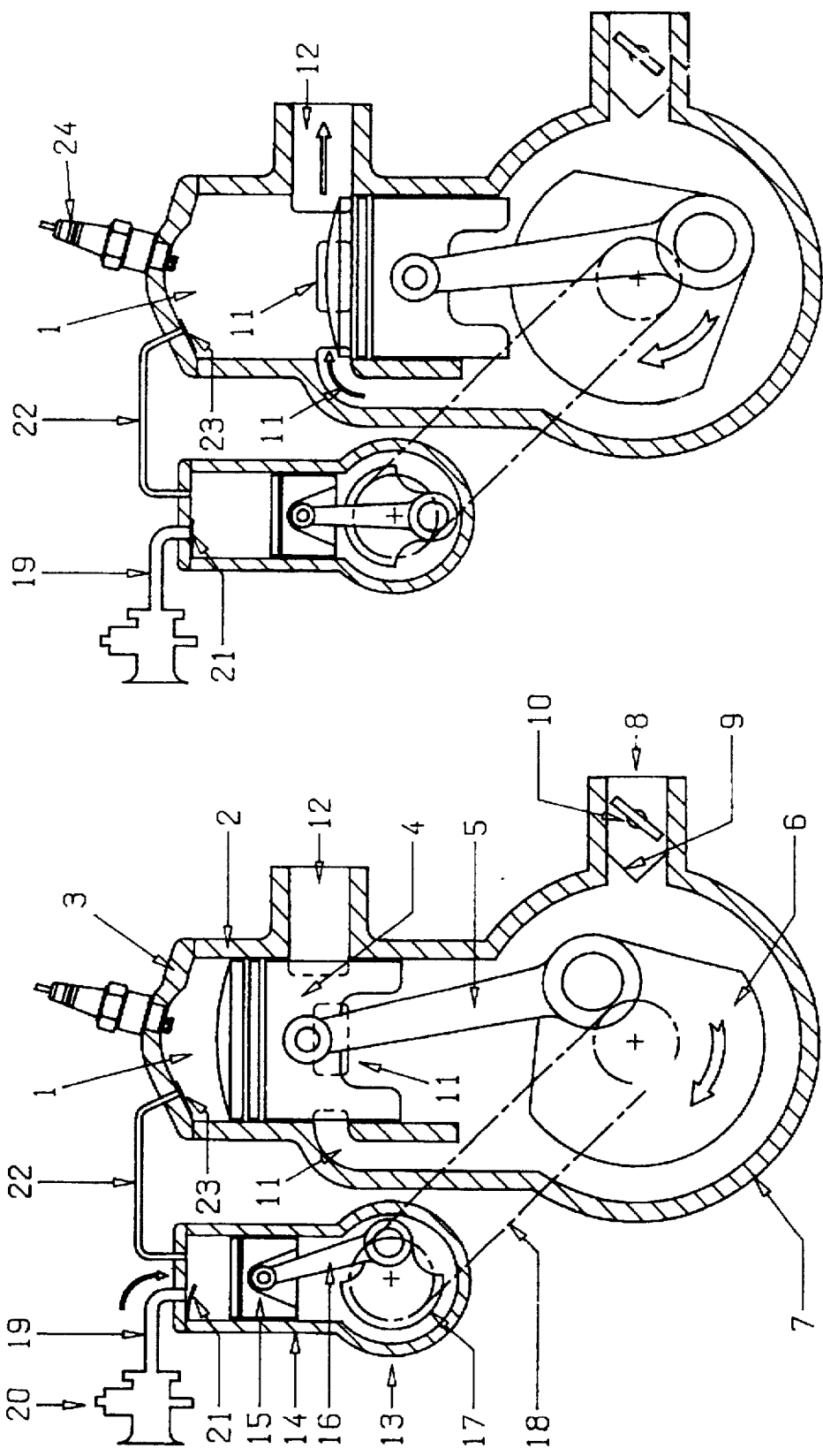

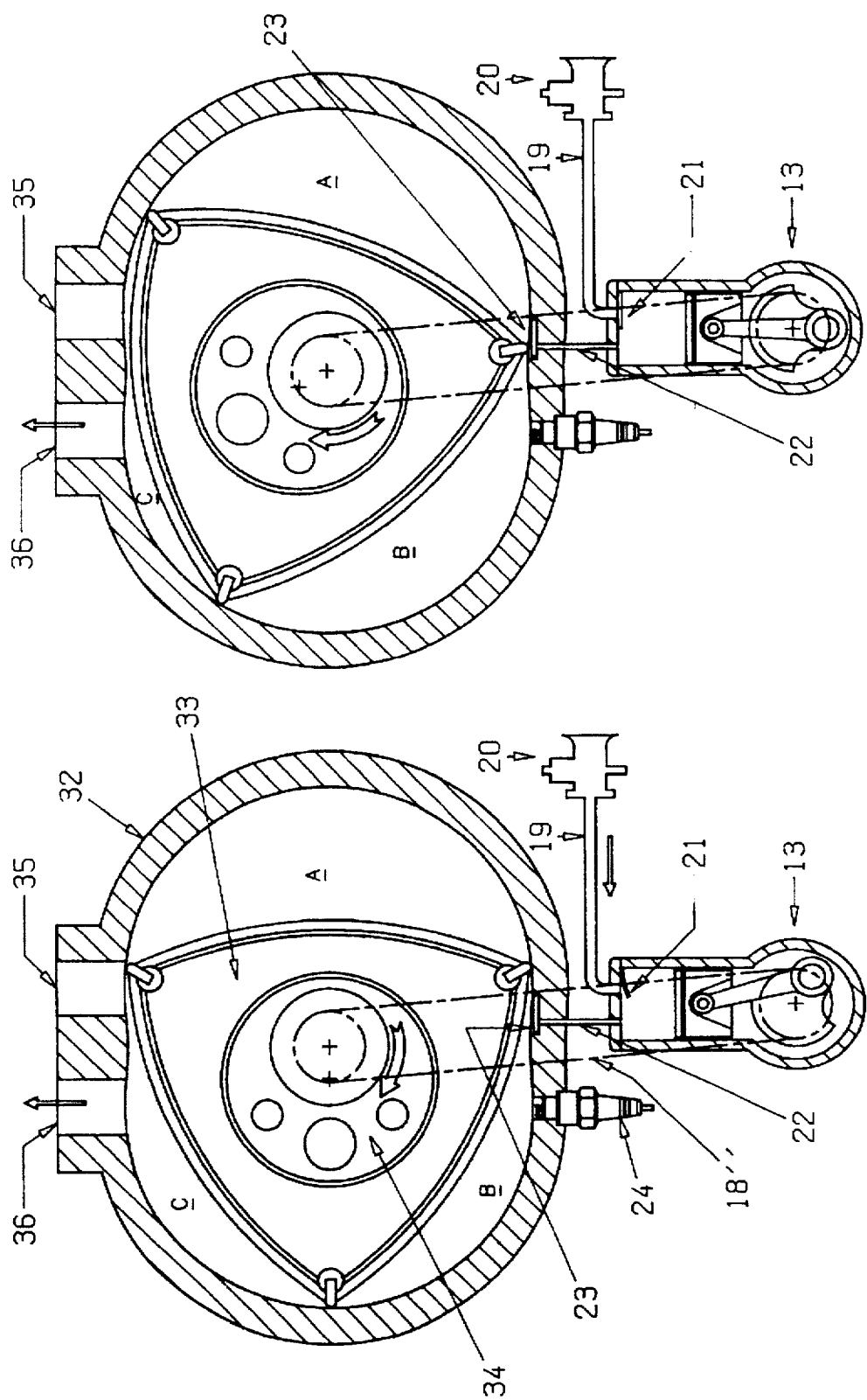

INTERNAL COMBUSTION ENGINE PROVIDED WITH A SYSTEM FOR DIRECT FUEL INJECTION WITH PNEUMATIC ASSISTANCE

The present invention is related to a special system of direct fuel-injection with pneumatic assistance, suitable for internal combustion engines, mainly those provided with spark ignition.

Direct fuel-injection into the combustion chamber of spark ignition engine provides improvements which hardly can be obtained with an external carburetted mixture: lets state some examples:

The suppression of the short-circuiting of the air/fuel mixture during scavenging in two stroke engines.

The suppression of the fuel short-circuiting, distinctive for four stroke engines with high valve overlap.

The stratification of the air/fuel mixture within the combustion chamber in order to improve combustion, specially with lean mixture.

The regulation of the engine load only by altering the injected fuel flow rate, which permits to eliminate the throttling of the inlet and therefore pumping losses, distinctive for four stroke engines.

The conjunction of the above mentioned points provides an increase of the engine efficiency and the reduction of exhaust emissions mainly at part load.

In this context the direct fuel injection requires an accurate injection timing and a high fuel atomization, which makes this system more complex than the one of external vaporization of fuel.

One knows several types of direct fuel-injection suitable for two stroke engines, in particular:

High-pressure liquid fuel-injection,

Pneumatically assisted fuel injection, (air-assisted injection).

In case of a pneumatic assistance, the compressed air needed can be delivered by an auxiliary compressor supplying injectors which are placed directly on the cylinder head, on top of each combustion chamber and which inject the fuel with a certain quantity of compressed air in order to promote the mixing and the atomization of said fuel.

An example of this system is described in "K. Schlunke—The Orbital Combustion Process Engine—10th Vienna Motor Symposium—VDI n 122, p. 63–78".

According to the publication SAE - 941 687, a mechanism allows to capture a small quantity of air from the compression stroke in the combustion chamber and restitues it for the pneumatic assistance during fuel injection.

In both cases, the injection time in these chambers is determined by the opening and the closing of the injectors which are under electronic control.

According to the documents EP 296969 and U.S. Pat. No. 4,244,255, a tapping of the crankcase-pump of a two stroke engine allows to send one part of the intake air towards the cylinder head via a controlled popped valve; the fuel is provided by an external injector placed before the valve. In this case, the injection timing is determined by the timing of the valve.

The purpose of the invention is to provide a system of air-assisted direct fuel-injection, which by means of a conventional carburettor forms an air-fuel mixture with the air of pneumatic assistance, requiring neither a controled valve, nor an electronic control for injection into the combustion chamber.

According to the invention, this objective is achieved in an engine including a single-piston compressor which is associated to each combustion chamber and sucks an air-fuel mixture and, by its discharge stroke, injects the mixture directly into said chamber at a precise moment determined by the timing of said compressor. This mixture is added to the air sucked by the chamber. The peculiarity of this invention is that the discharge valve of the compressor is placed inside the combustion chamber. The invention offers the following improvements:

Simplicity of setting or implementation, at a low cost thanks to the possibility to adapt directly the commonly used fuel management devices for external vaporization (i.e. carburettor, mechanical or electronic injection): those will be placed at the inlet of the auxiliary compressors, while the engine inlet will remain independent and only air-feeded.

Wide range of injection timing, allowing to achieve a better charge-stratification for any working condition.

High speed potential of the engine (for example 12,000 t/min), as to the fact that the mixing of the fuel is independent of the injection time and that the compressor valves are valves which autorize high opening and closing frequences.

Highly effective atomization of the fuel, with at least partial vaporisation due to the fact that the fuel will be heated while passing through the compressor before being injected into the chamber.

Possibility to increase the power in proportion to the fraction of air added into the chambers by the compressors.

Possibility of working with liquid or gaseous fuels.

The invention is described hereafter by several examples of application on different engine types and according to several possibilities to realize the air-fuel mixture, with no limitation to the peculiarities of the invention.

In any case the displacement of the compressor is small in relation to the one of the combustion chamber, for example 10 to 20% for gasoline injection, which provides an adequate quantity of air in order to obtain a good atomization of the fuel. The compression ratio of the compressor must be as high as possible in order to achieve a high efficiency.

FIGS. 1A,1B,1C,1D are schematic vues of a two stroke engine, according to the invention, provided with a carburettor fitted at the inlet of the compressor and displayed at successive phases of working.

FIGS. 7A, 7B, 7C, 7D are schematic vues of a Wankel type rotary engine, according to the invention at successive phases of working.

Figure 1D:
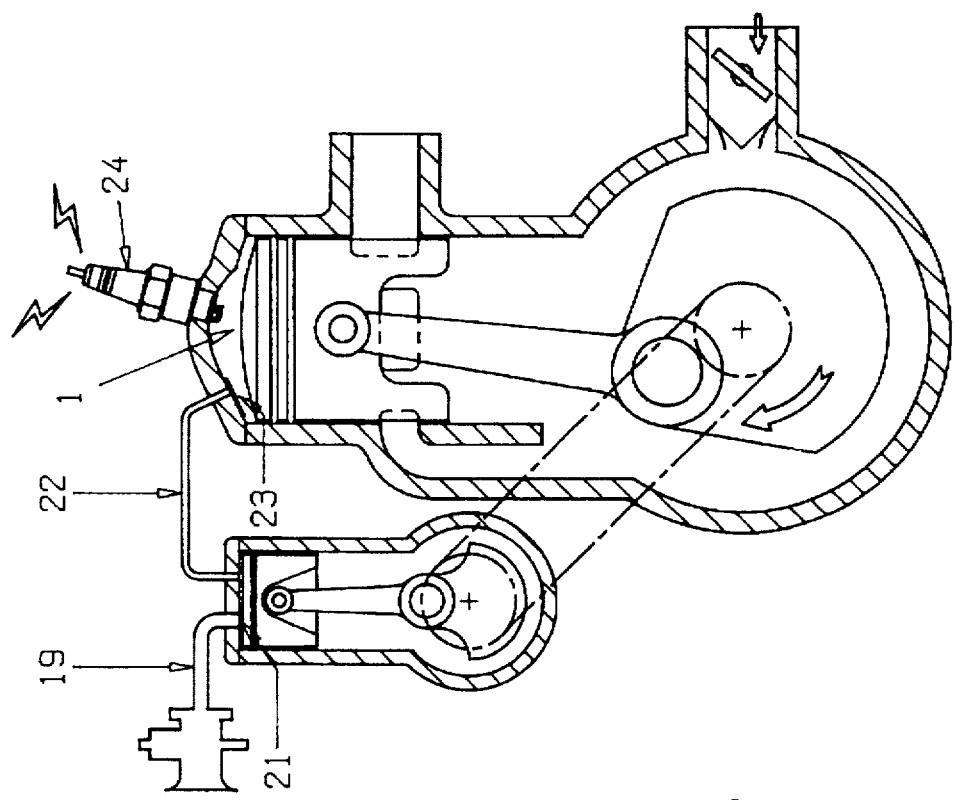

FIGS. 1A, 1B, 1C, 1D represent schematically a crankcase-pump-type two-stroke engine, according to the invention, with the combustion chamber (1) delimited by the cylinder (2), the cylinder head (3) and the piston (4) which shifts with a reciprocating movement and runs due to a connecting rod (5) the crankshaft (6) which turns in the inside of the crankcase (7). The crankcase is provided with an air intake port (8) fitted with reed valves (9) and a throttle valve (10).

Transfer ports (11) relate the crankcase (7) to the combustion chamber (1), while the exhaust port (12) determinates the opening of the chamber to the atmosphere.

The compressor (13) includes a cylinder (14), a piston (15), with the connecting rod (16), set in action by a crankshaft (17) which is driven by the engine crankshaft (6) with a chain (18), according to a ratio of 1:1. The compressor is equiped with an inlet pipe (19), fitted with a carburettor (20) and an inlet valve (21) situated in the inside of the compressor chamber, as well as a discharge pipe (22), fitted with a one-way valve (23) at its end emerging in the combustion chamber.

In FIG. 1A, according to the direction of rotation indicated by the arrow, the engine is at the expansion stroke and the air in the crankcase-pump is compressed, as to the fact that the valves (9) are closed. Simultaneously, the compressor sucks an air-fuel mixture via the carburettor (20) and the pipe (19), meanwhile the valve (23) is closed due to the pressure prevailing in the combustion chamber, as the valve (21) is open due to the depressurization in the compressor chamber.

In FIG. 1B the engine is at its exhaust time by the exhaust port (12) and charging of the fresh air through the transfer ports (11) while the compressor completes the inlet stroke, as the valves (21) and (23) are closed.

Figure 1C:
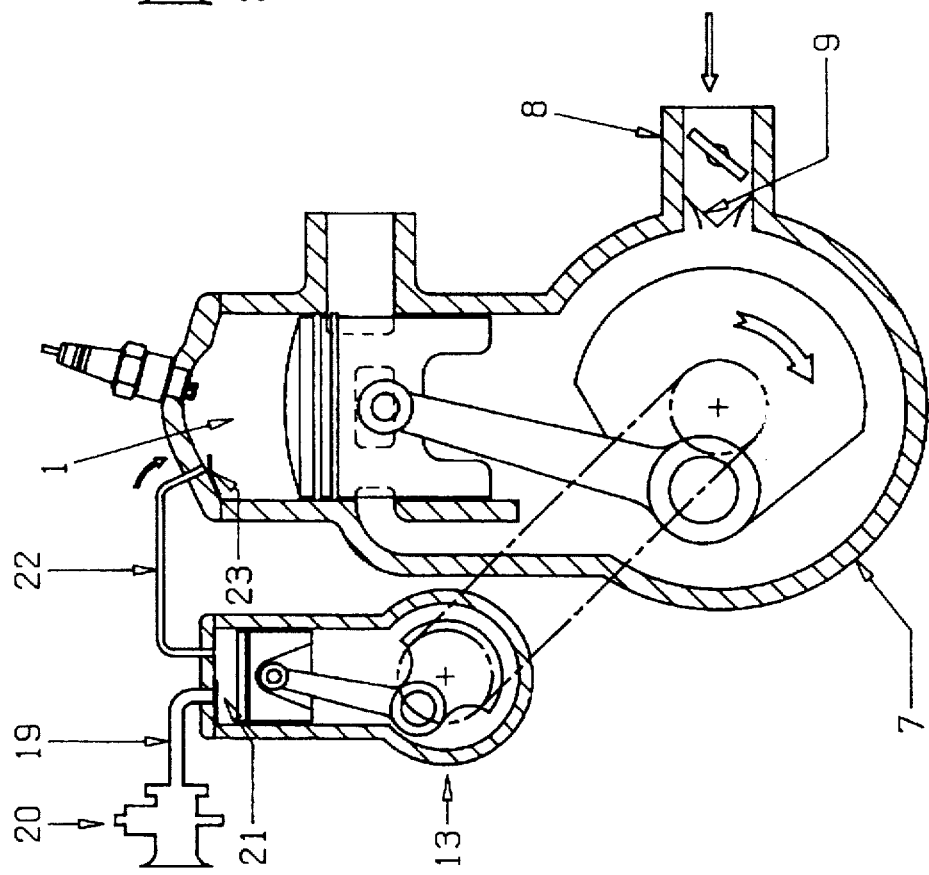

FIG. 1C shows the engine at the compression stroke in the chamber (1) and the air inlet in the crankcase (7), the compressor (13) starts to compress the mixture. As the compression ratio of the compressor is very high and it is slightly advanced with regard to the engine piston, the pressure in the compressor chamber is higher than the one in the engine chamber (1) during all its compression stroke, which induces the progressive delivery of the mixture through the pipe (22), and its injection into the chamber (1) after opening the valve (23).

In FIG. 1D the engine piston is just before reaching TDC, at the moment when the ignition takes place due to the spark plug (24), while the piston (15) of the compressor has reached its TDC, and the delivery of the mixture into the the combustion chamber is completed. The valve (23) closes, the combustion begins in the chamber (1), and the cycle continues according to FIG. 1A.

Figure 2:
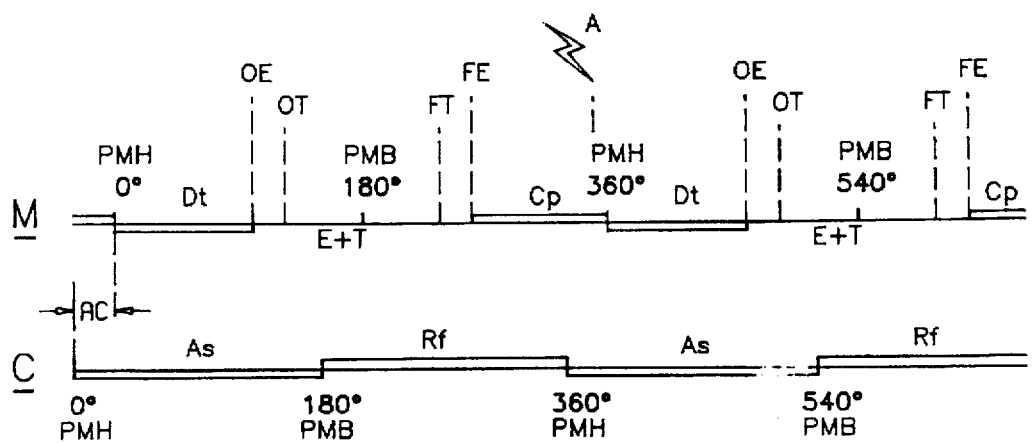
FIG. 2 is a timing diagram of the compressor in relation to the chamber to which it is associated to, as to the example of previous figures.

FIG. 2 shows a timing diagram of the compressor according to the example shown in FIGS. 1A to 1D.
M=timing of the engine in crankshaft degrees
C=timing of the compressor.
PMH=TDC (TOP DEAD CENTER).
PMB=BDC (BOTTOM DEAD CENTER).
Dt=engine expansion stroke; Cp=engine compression stroke.
E+T=Engine exhaust and transfer; A=ignition
As=Compressor intake.
Rf=Compressor delivery.
OE=exhaust port opening; FE=exhaust port closing.
OT=transfer port opening ; FT=transfer port closing.
AC=Compressor advance in relation to the engine.

The advance AC is to obtain a higher pression in the compressor in order to permit the delivery from the beginning of the compression stroke and to come to an end before ignition.

Figure 3:
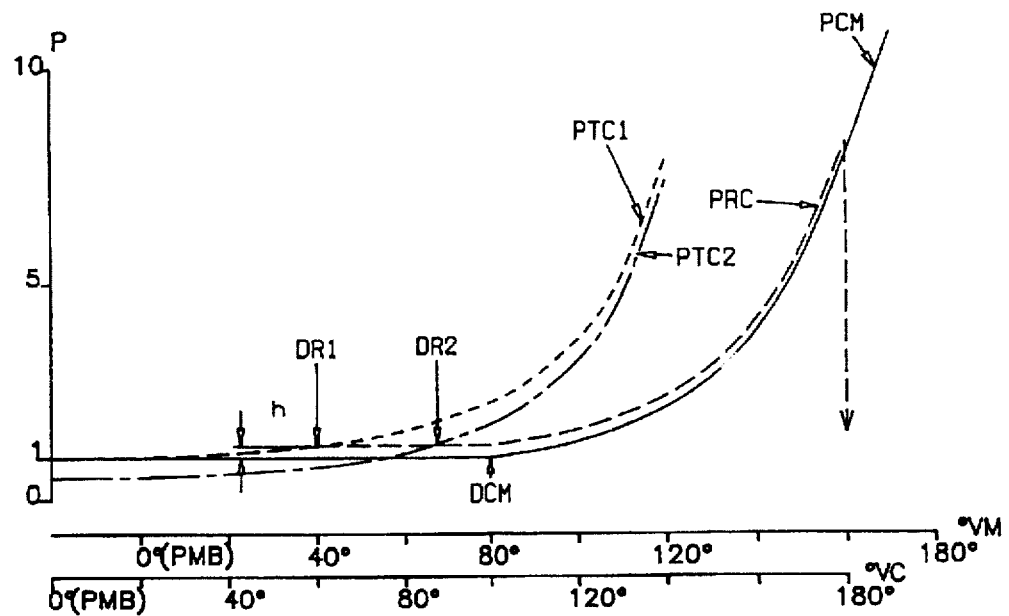
FIG. 3 is a diagram of pressure-versus-volume of the combustion chamber and the associated compressor, while this one is working at complete opening or partial opening of the inlet pipe in reference to the examples given from 1A to 1D.

FIG. 3 represents a simulation of pressure evolution within the chamber and the compressor versus crankshaft degrees of the engine (VM) and of the compressor (VC), according to the examples of the FIGS. 1A to 1D.
PCM=curve of pressure in the engine chamber.
DCM=the beginning of the compression in the engine chamber.

While the compressor works at wide open throttle of the carburettor (20), the inlet pressure is equal to the atmospheric pressure, and the theoretic compression curve (without delivery) of the compressor is PTC1. Taking into consideration the pressure loss (h) through the discharge duct (22) and the delivery valve (23) of the compressor, the beginning of the mixture injection in the combustion chamber takes place at point DR1, and the actual compression curve is PRC.

When the throttle valve of the carburettor is partly opened the inlet pressure is lower than the atmospheric pressure, and the theoretic compression curve of the compressor is PTC2: the quantity of air/fuel mixture injected is reduced and the beginning of the delivery is delayed up to the point DR2, which increases the stratification in the chamber.

Figure 8:
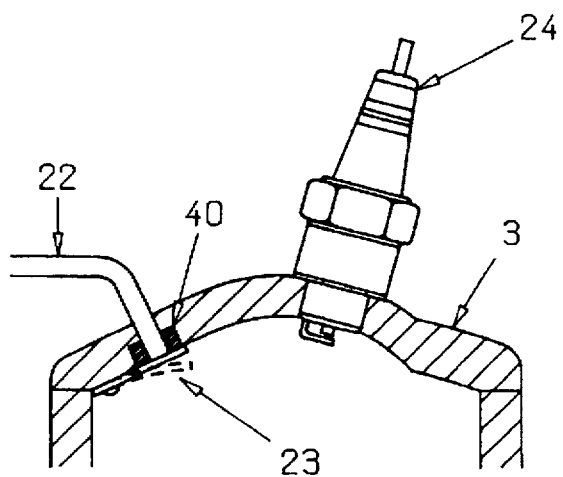
FIGS. 8 and 9 represent two simple systems allowing to delay or to control the opening of the delivery valve in the combustion chamber.
Figure 9:
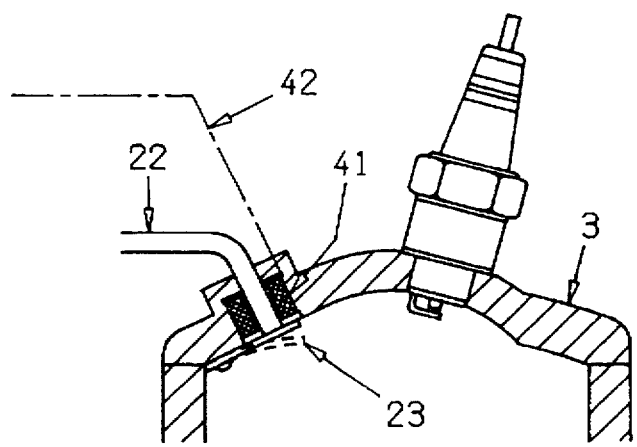

Besides, the pressure loss h can be chosen by calibrating the delivery valve (23), or by peculiarities of said valve discribed in FIGS. 8 and 9, which determine the position of DR1 and DR2.

FIGS. 4A to 4F show a schematic vue of a four stroke engine, according to the invention, including the combustion chamber (1'), the cylinder (2'), the piston (4') which sets the crankshaft(6') into action via a connecting rod (5'); the crankcase (7'); the cylinder head (3') including an inlet pipe (25) with a poppet valve (26), an exhaust pipe (27) with a poppet valve (28), and spark plug (24). The auxiliary compressor (13), identical to the one shown in FIG. 1A, is driven by the chain (18') in a way to rotate at half speed of the engine. In this example, the fuel is supplied by an electronically controlled injector fitted onto the compressor's inlet pipe (19). The compressor works always at wide open air inlet mode and the engine load is controlled by the fuel flow of the injector.

The delivery pipe (22) of the compressor (13) is provided with a valve (23) at its end emerging in the chamber (1').

Figure 4B:
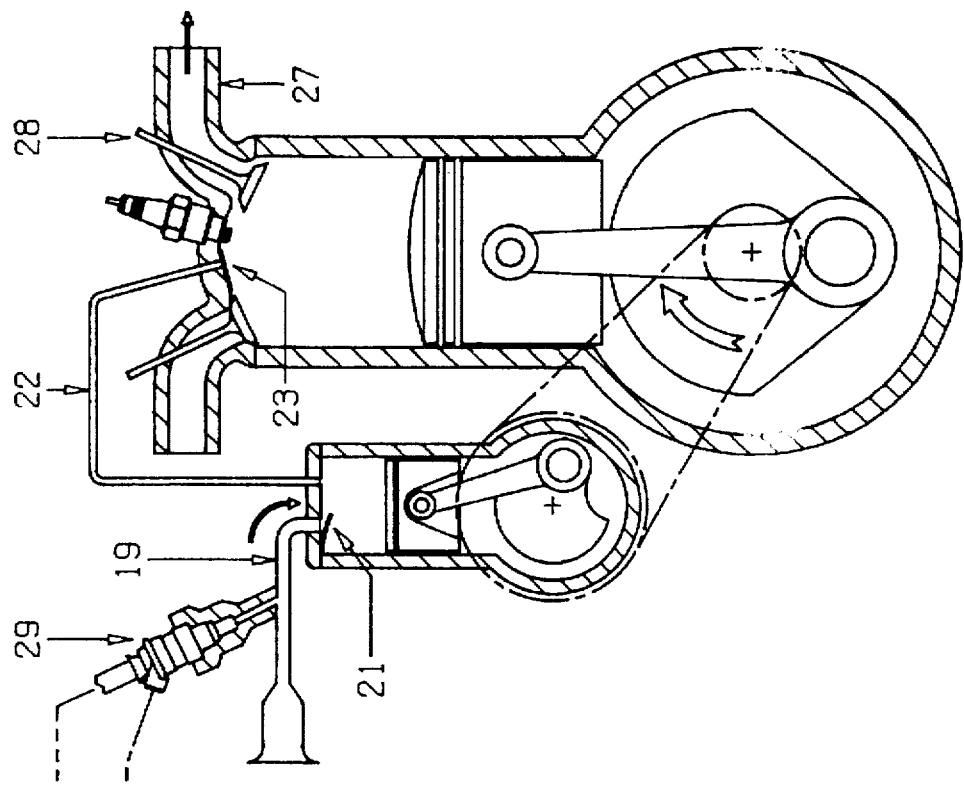
FIGS. 4A, 4B, 4C, 4D, 4E, 4F are schematic vues of a four-stroke engine according to the invention provided with a fuel injector fitted at the inlet of the compressor, displayed at successive phases of working.
Figure 4A:
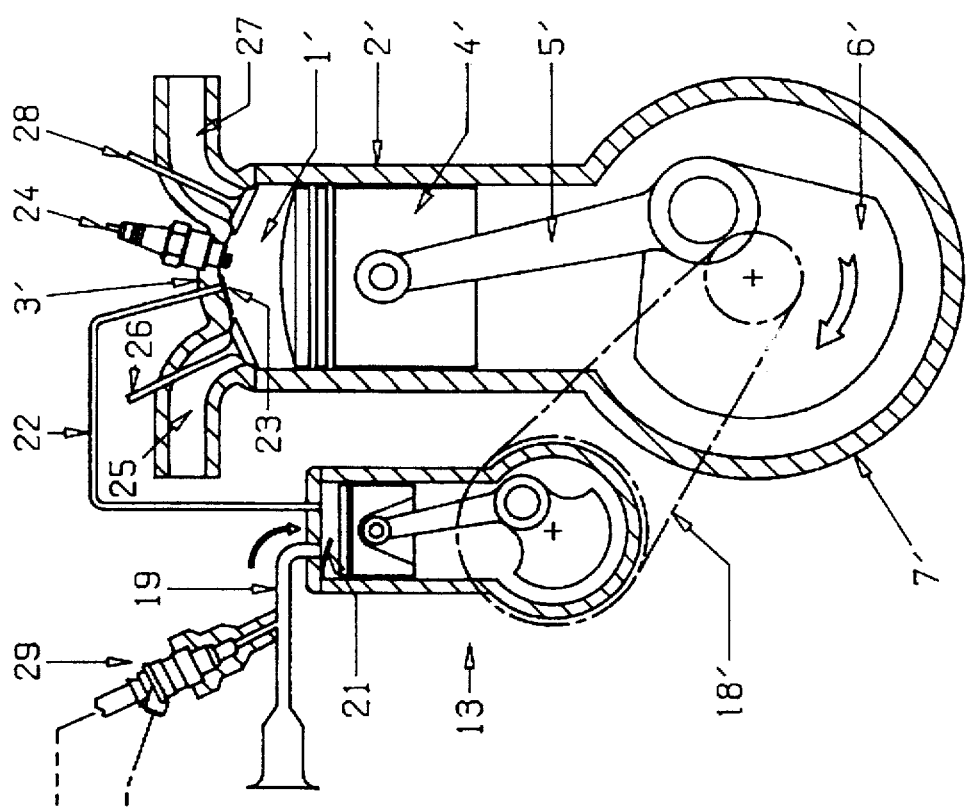

In FIG. 4A, as to the direction of rotation indicated by the arrow, the engine piston (4') is at its expansion stroke, while the compressor begins the inlet of the air-fuel mixture via the pipe (19), with the valve (21) open, and the valve (23) closed.

In FIG. 4B, the engine has completed the expansion stroke and begins the exhaust stroke, after opening of the valve (28); the compressor continues the inlet stroke of the mixture.

Figure 4D:
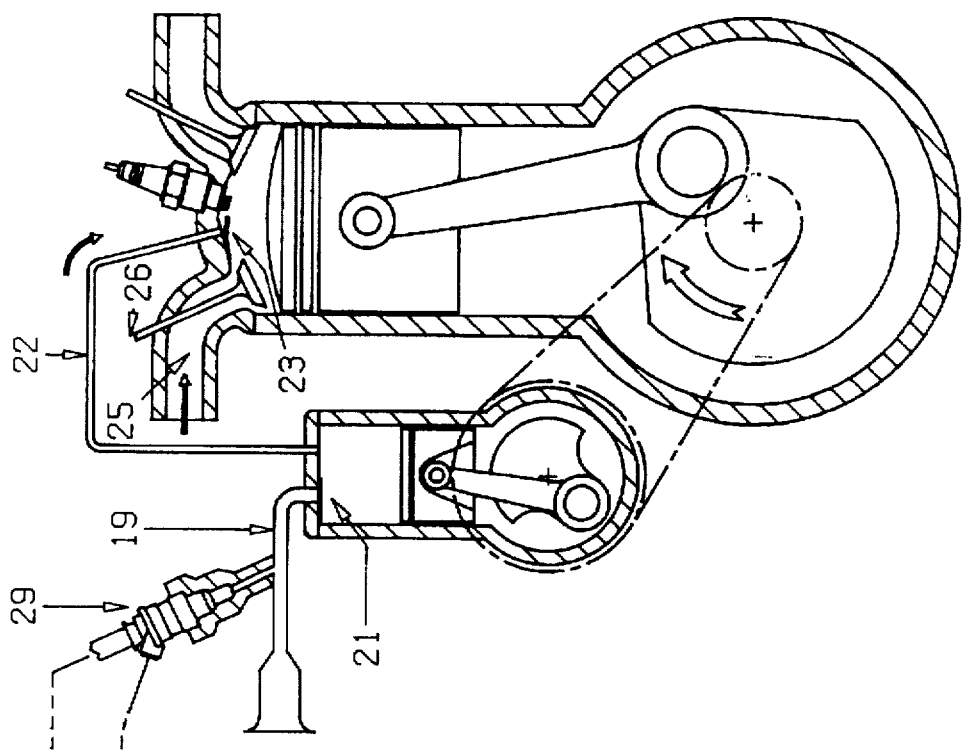
Figure 4C:
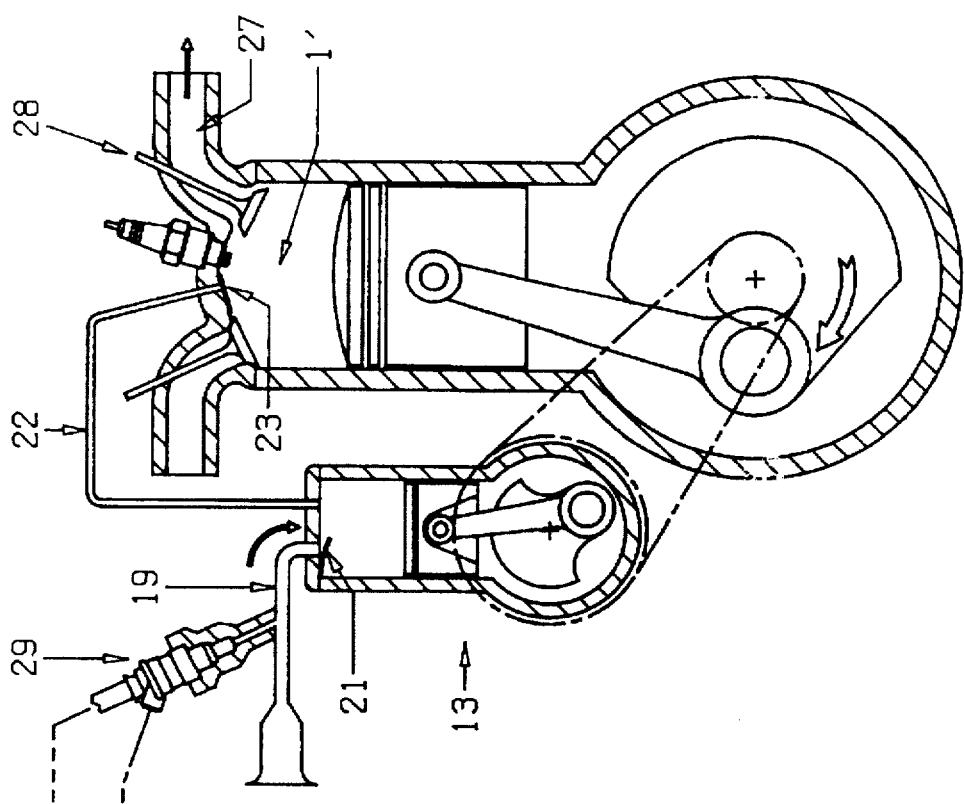

In FIG. 4C the exhaust stroke continues in the engine, as well as the inlet of the air-fuel mixture in the compressor.

In FIG. 4D, the engine starts the air inlet stroke via the pipe (25) with the valve (26) opened and the valve (28) closed; while the compressor begins the delivery of the air-fuel mixture in the chamber via the pipe (22), with the valve (21) closed and the valve (23) opened.

Figure 4F:
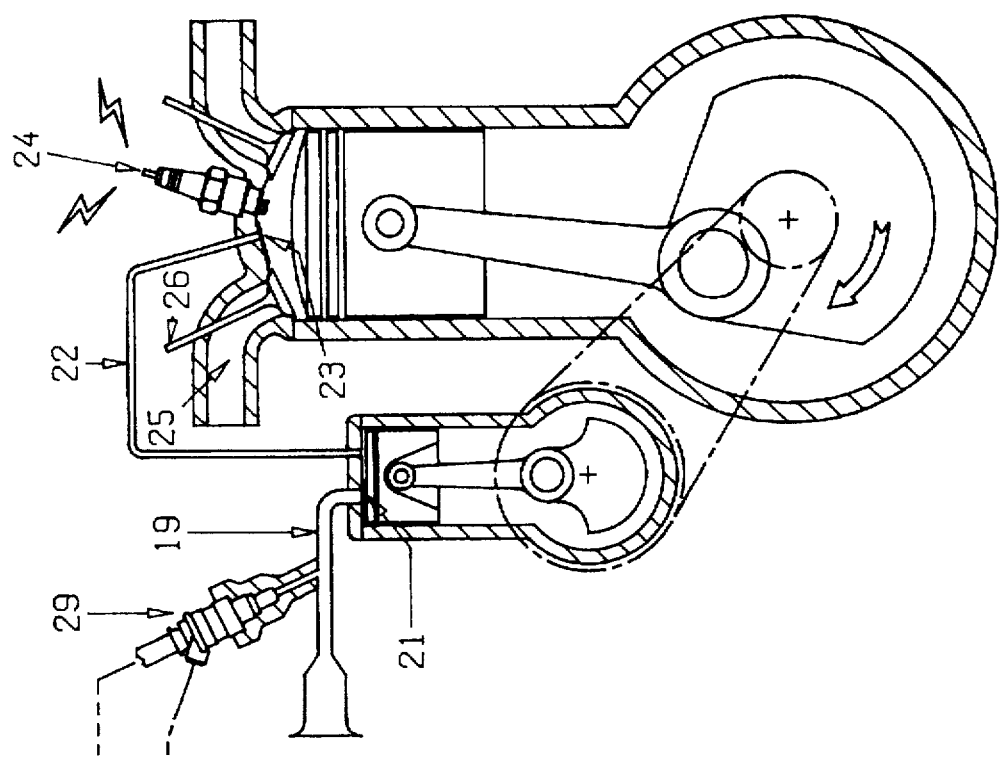
Figure 4E:
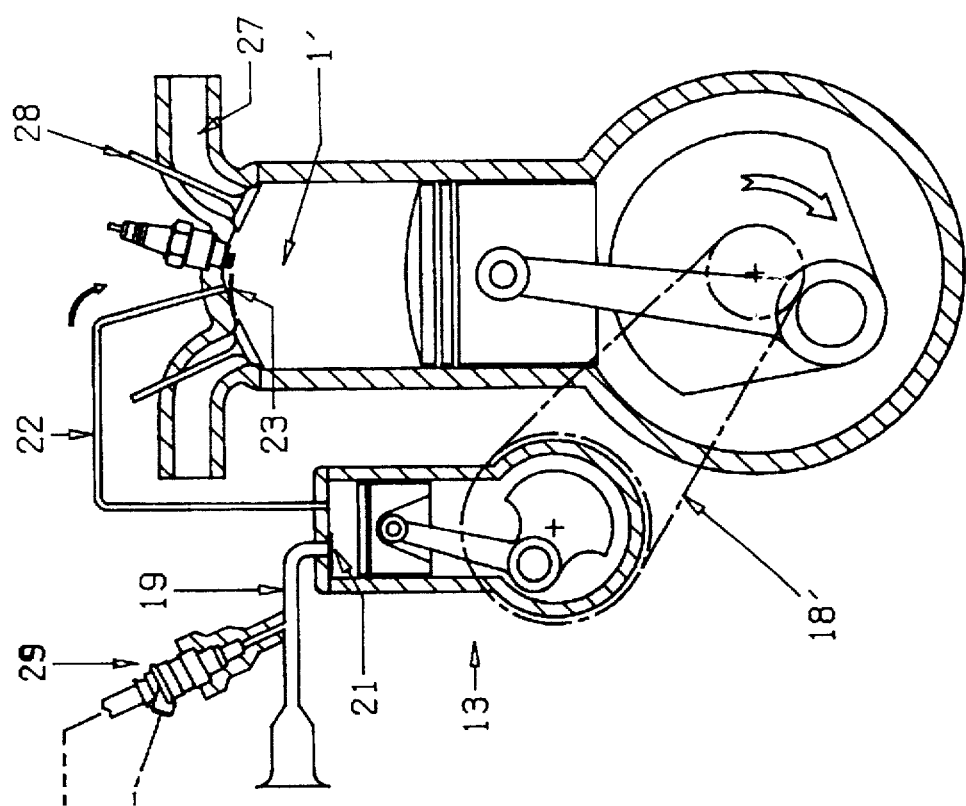

In FIG. 4E the engine completes the inlet stroke, the valve (26) is closed, and the compressor continues the delivery stroke while the engine is at its compression stroke.

In FIG. 4F, the compressor being at its TDC completes the delivery time, the valve (23) closes while the ignition takes place in the engine chamber by the sparking plug (24). The cycle continues according to FIG. 4A.

Figure 5:
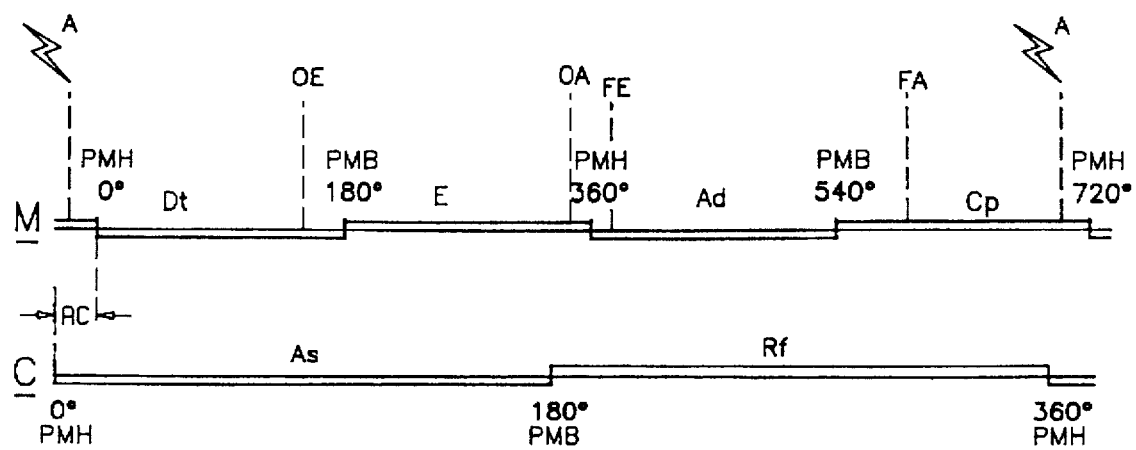
FIG. 5 is a timing diagram of the compressor in relation to its associated chamber according to the example of the FIGS. 4A to 4F.

FIG. 5 shows the timing diagram of the compressor according to the examples presented in FIGS. 4A to 4F.

M=timing of the engine in crankshaft degrees of rotation.
C=timing of the compressor in relation to its crankshaft degrees.
PMH=TDC.
PMB=BDC.
Dt=engine expansion stroke; E=engine exhaust stroke.
OE/FE=opening/closing of the engine exhaust
OA/FA=opening/closing of the engine inlet
Ad=engine inlet stroke; Cp=engine compression stroke.
A=ignition
As=Compressor intake.
Rf=Compressor discharge.
AC=Compressor advance in relation to the engine.

Figure 6:
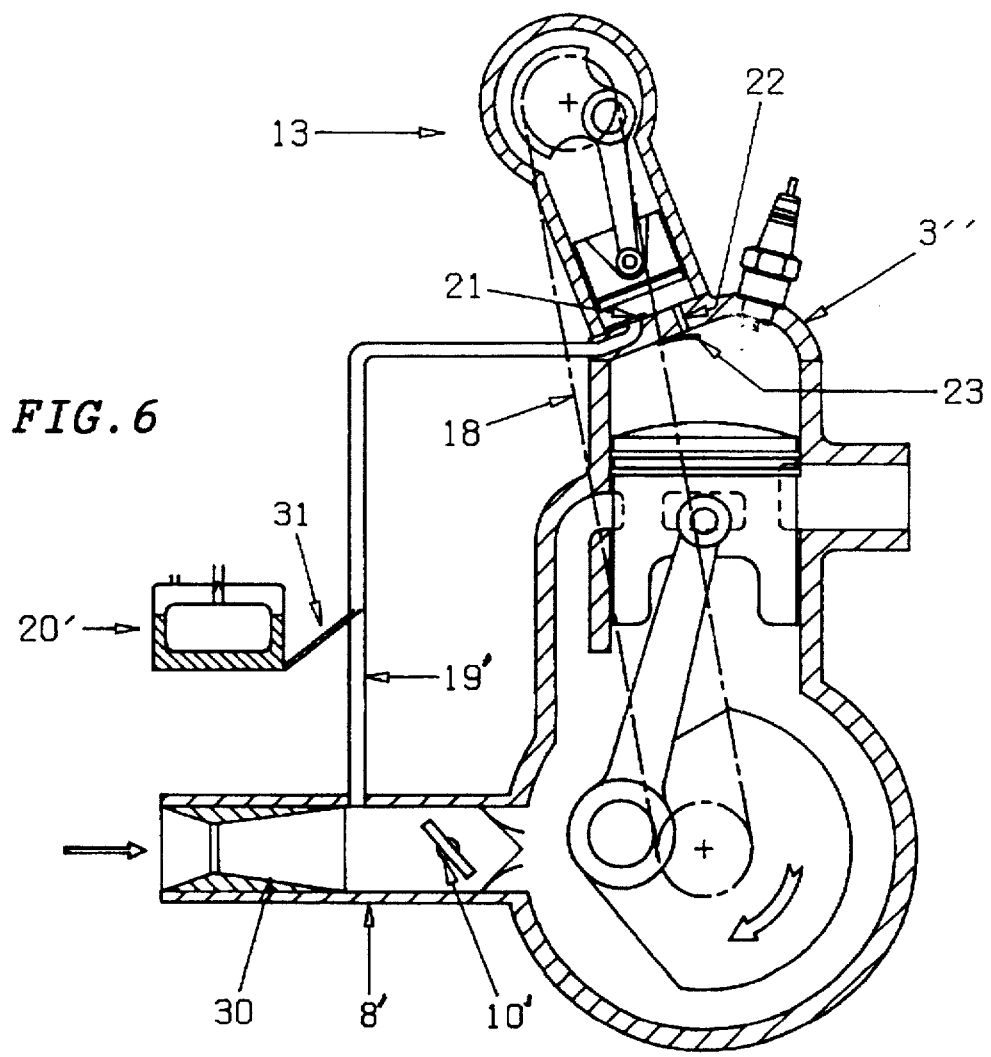
FIG. 6 represents an engine according to the invention fitted with a special carburettor at the inlet of the compressor.

FIG. 6 shows an engine according to the invention in which the compressor for air-assisted injection (13) is identical to the one shown in FIG. 1A, but positioned onto the cylinder head (3"), in order to minimise the length of the delivery pipe (22) and to obtain a maximum compression ratio of the compressor, for example higher than 50:1.

In addition, the fuel management device is particular to the invention: the inlet pipe (8) of the engine is provided with a venturi (30) and a throttle valve (10); the inlet pipe (19) of the compressor (13) is connected to the inlet pipe (8) of the engine between the venturi (30) and the throttle valve (10), in a way that the air coming through the venturi supplies at the same tame the engine inlet and the compressor inlet, providing the same vacuum within the pipes (8) and (19). A carburettor (20') supplies with fuel the pipe (19) through the spray nozzle (31). The engine load is regulated by the throttle valve (10), and the fuel flow is regulated by the vacuum due to the venturi (30). By this way, an accurate fuel metering can be achieved in relation to the engine load.

FIGS. 7A to 7D show a schematic vue of the invention applied on a Wankel rotary engine. This one includes an trochoidal casing (32) and a rotor (33) fitted onto a crankshaft (34). The whole constitues three rotating chambers (A,B,C), which realise by turns four stroke cycles, i.e. inlet through an inlet port (35), compression, expansion and exhaust by an exhaust port (36). Each stroke has a term of 270 degrees of crankshaft rotation or 90 degrees of rotor rotation.

The auxiliary compressor (13), identical to the one described in FIGS. 1 to 4, is driven by the engine through a toothed-belt (18"), at a 1:1 ratio.

A carburettor (20) provides the fuel. The compressor (13) is connected to the engine chamber by its delivery pipe (22), in an area determined between the beginning of the inlet stroke and the beginning of the expansion stroke, through the trochoidal casing or through the side wall (the bottom of the chambers (A,B,C) in the illustration). In this example, the pipe (22) emerges through the casing (32) and the discharge valve (23) is located at the inside face of said housing (32).

In FIG. 7A, according to the direction of rotation indicated by the arrow, chamber (A) is at the end of its inlet stroke via the inlet port (35), chamber (B) is at its expansion stroke and chamber (C) is at its exhaust stroke via the exhaust port (36). The compressor which has the delivery pipe (22) facing to the chamber (B), is at the inlet stroke of the air-fuel mixture via the pipe (19), with the valve (21) open and the valve (23) closed.

In FIG. 7B, the compressor (13) is at its BDC and finishes the inlet; at this moment, due to the rotation of the rotor, it is chamber (A) which starts a compression stroke that faces the delivery pipe (22).

Figure 7C:
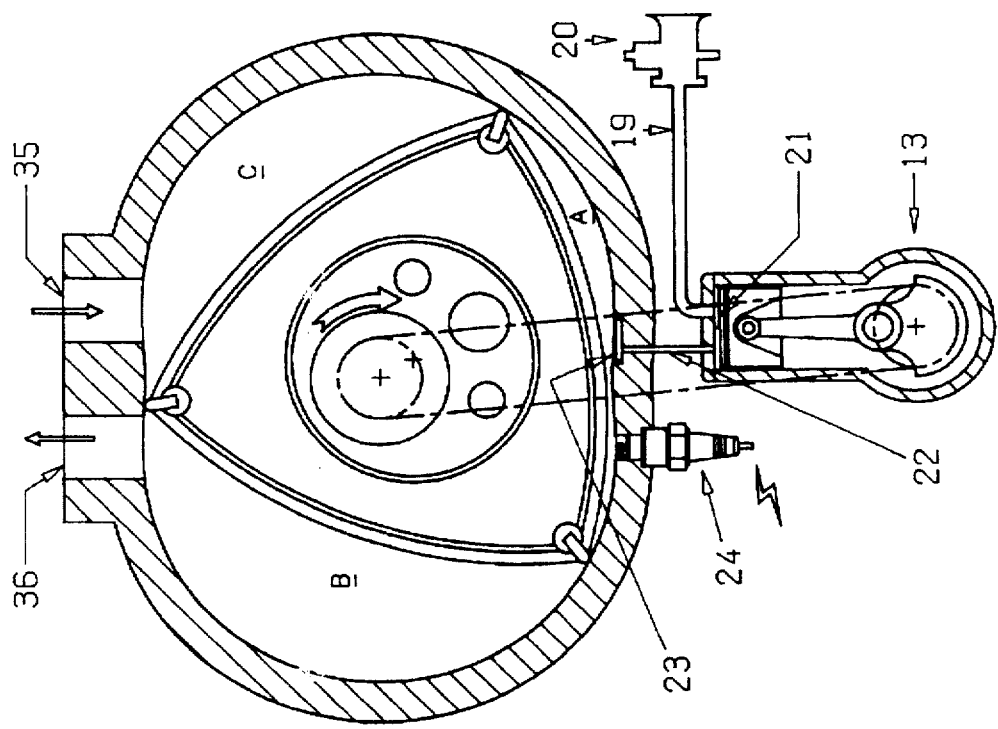

In FIG. 7C, the compressor delivers the mixture into the chamber (A) with the valve (23) open. Chamber (B) is at the end of the expansion stroke and chamber (C) begins the inlet.

Figure 7D:
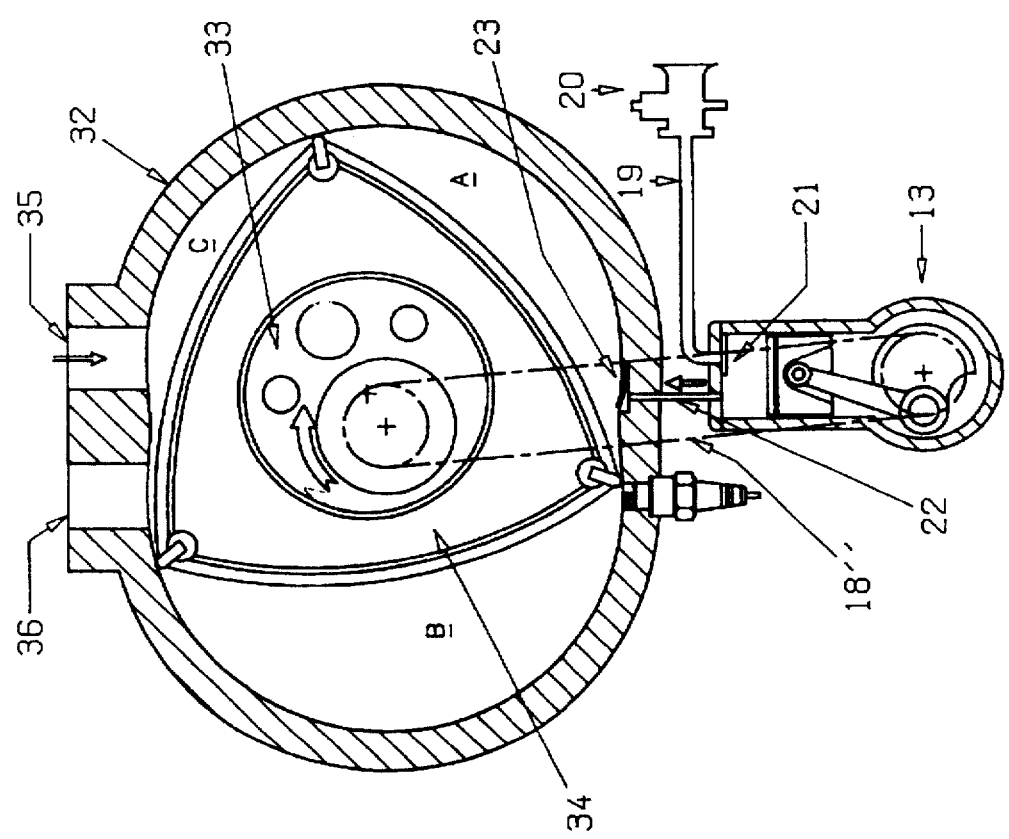

In FIG. 7D, the compressor is at its TDC, the delivery is completed, the ignition takes place in chamber (A), the exhaust in chamber (B) and the inlet in chamber (C). Following the rotation, the compressor (13) supplies by turns chamber (C) and chamber (B).

FIG. 8 shows a device allowing to delay the beginning of the injection of the air-fuel mixture discharged by the compressor. This device comprises a permanent magnet (40) fitted on the delivery valve (23) seat, said valve being made with a material which is attracted by the magnet.

In a closed position, the valve (23) lays on its seat with a constant force determined by the magnet. At the delivery stroke of the compressor, the pressure in the pipe (22) must overcome this added force applied onto the valve (23), which delays its opening and lowers therefore the injection duration in relation to delivery stroke of the compressor. By this way the beginning of the fuel injection in a two stroke engine can be delayed in order to eliminate any risk of short-circuiting of the air-fuel mixture towards the exhaust. As to the fact that the injection pressure is higher, the atomization and the mixing of the fuel within the chamber will be improved.

FIG. 9 is a variation of FIG. 8, in which the magnet is a solenoid (41) supplied with current by the wire (42). An electronic control of this magnet allows to determinate accurately the opening moment and also the closing moment of the valve depending on parameters, like the engine speed, load or temperature.

According to a complementary peculiarity of the invention, the compressors can be driven by a mechanism with variable timing (not shown), similar to those already known on four stroke engines, for varying the timing of their camshafts.

One of these devices appliable for the invention, allows to vary the moments of the beginning and the ending of the injection of the air-fuel mixture by the compressor (13), and can be associated to the mechanisms shown in the FIGS. 8 and 9, in order to improve the engine operation.

Other elements not illustrated can complete the invention, in particular the heating of the sucked air by the compressor in order to allow a better vaporization of the fuel, for instance with an electric heater placed in the inlet pipe of the compressor or by a heat exchanger from the exhaust gas, or by direct recycling of a fraction of the exhaust gas towards the compressor.

Other applications of the invention, not represented are for example those where the fuel is a gas. In these cases the appropriate carburettor or injection system are to be adapted.

What is claimed is:

1. An internal combustion engine with one or more combustion chambers connected to an engine crankshaft, which comprises:

a single piston type compressor associated with each combustion chamber, wherein each compressor has successive delivery strokes each of which feeds an air-fuel mixture to the combustion chamber with which the compressor is associated, and wherein the compressor has a displacement which is distinctly lower than the displacement of the combustion chamber with which the compressor is associated;

wherein each compressor sucks via an intake pipe an air-fuel mixture and by the action of each of the delivery strokes of said compressor injects the air-fuel mixture directly into said combustion chamber through a delivery valve of said compressor placed inside said combustion chamber at the end of a delivery pipe; and wherein each compressor is timed such that its delivery stroke ends at the latest when ignition takes place in the combustion chamber with which the compressor is associated.

2. An engine according to claim 1, wherein each compressor is connected to a compressor crankshaft, and wherein the crankshaft of each compressor is driven by the crankshaft of the engine via a transmission in order to maintain a constant ratio between the rotation speed of said compressor and the rotation speed of said engine crankshaft.

3. An engine according to claim 1, wherein the engine is a Wankel type engine with one or more rotating pistons fitted onto the engine crankshaft and each of the pistons orbiting inside a trochoidal casing delimiting three chambers (A,B, C), each of said chambers performing a complete cycle of inlet, compression, expansion and exhaust by three complete revolutions of the engine crankshaft or one complete revolution of the piston, characterized in that one compressor is associated with each unit of a rotating piston-trochoidal casing.

4. An engine according to claim 1, further including one or more carburetors with each of said carburetors formed by a venturi situated in an intake duct of the engine, a throttle valve situated in said intake duct of the engine, the intake pipe of the compressor connected to said intake duct of the engine in area between the venturi and the throttle valve, and a device that delivers and vaporizes fuel into the intake pipe of the compressor.

5. An internal combustion engine with one or more combustion chambers connected to an engine crankshaft, which comprises:

a single piston type compressor associated with each combustion chamber, wherein each compressor has successive delivery strokes each of which feeds an air-fuel mixture to the combustion chamber with which the compressor is associated, and wherein the compressor has a displacement which is distinctly lower than the displacement of the combustion chamber with which the compressor is associated;

wherein each compressor sucks via an intake pipe an air-fuel mixture and by the action of each of the delivery strokes of said compressor injects the air-fuel mixture directly into said combustion chamber through a delivery valve of said compressor placed inside said combustion chamber at the end of a delivery pipe; and means for controlling the air-fuel mixture sucked by the compressor in accordance with engine vacuum and not compressor vacuum.

6. An engine according to claim 5, further including one or more carburetors with each of said carburetors formed by a venturi situated in an intake duct of the engine, a throttle valve situated in said intake duct of the engine, the intake pipe of the compressor connected to said intake duct of the engine in area between the venturi and the throttle valve, and a device that delivers and vaporizes fuel into the intake pipe of the compressor.

7. An engine according to claim 1, characterised in that said delivery valves are non-operated valves, as the opening is caused by the pressure in the delivery pipe which is higher than the pressure prevailing in the combustion chamber, and the closing is caused by a gas pressure in the combustion chamber higher than the one prevailing in the delivery pipe and by the drawback force of said valves.

8. An engine according to claim 1, of two stroke, single or multi-piston type i.e., one complete cycle of inlet, compression, expansion, exhaust taking place in each chamber by a complete revolution of the engine crankshaft, characterised in that said compressors rotate exactly at the same speed of said engine crankshaft.

9. An engine according to claim 1, of four stroke, single- or multi piston type, i.e. one complete cycle of inlet, compression, expansion, exhaust taking place in each chamber by two complete revolutions of the engine crankshaft, characterised in that said compressors rotate exactly at half speed of the engine crankshaft.

10. An engine according to claim 1, characterised in that the delivery valve of each of said compressors comprises a magnet fitted on the valve seat and acting on said valve with an attractive force.

11. An engine according to claim 10, characterised in that said magnet is a solenoid-type magnet.

12. An engine according to claim 1, characterised in that the transmission for each compressor is fitted with a device allowing to vary the timing of said compressor in relation with the combustion chamber to which it is associated.

* * * * *